US012590488B2

(12) United States Patent
Zhang et al.

(10) Patent No.: US 12,590,488 B2
(45) Date of Patent: Mar. 31, 2026

(54) VEHICLE CHARGING PORT COVER CONTROL METHOD AND VEHICLE CHARGING PORT COVER CONTROL DEVICE

(71) Applicant: BYD COMPANY LIMITED, Shenzhen (CN)

(72) Inventors: Canlin Zhang, Shenzhen (CN); Xiaoling Zheng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 184 days.

(21) Appl. No.: 18/533,392

(22) Filed: Dec. 8, 2023

(65) Prior Publication Data

US 2024/0102336 A1      Mar. 28, 2024

Related U.S. Application Data

(63) Continuation of application No. PCT/CN2022/116187, filed on Aug. 31, 2022.

(30) Foreign Application Priority Data

Aug. 31, 2021    (CN) .......................... 202111014355.2

(51) Int. Cl.
*E05F 15/73*          (2015.01)
*B60L 53/10*          (2019.01)
(Continued)

(52) U.S. Cl.
CPC .............. *E05F 15/73* (2015.01); *B60L 53/16* (2019.02); *H01R 13/447* (2013.01); *B60L 53/11* (2019.02); *E05Y 2900/534* (2013.01)

(58) Field of Classification Search
CPC .......... E05F 15/73; B60L 53/16; B60L 53/11; H01R 13/447; E05Y 2900/534
See application file for complete search history.

(56) References Cited

U.S. PATENT DOCUMENTS

2017/0158079 A1    6/2017  Lim et al.
2020/0318399 A1*  10/2020  Ueki ........................ G07C 5/08

FOREIGN PATENT DOCUMENTS

CN        205311531 U      6/2016
CN        107284264 A      10/2017
(Continued)

OTHER PUBLICATIONS

The World Intellectual Property Organization (WIPO) International Search Report for PCT/CN2022/116187 Nov. 3, 2022 6 Pages.

*Primary Examiner* — Hunter B Lonsberry
*Assistant Examiner* — Besufekad Lemma Tessema
(74) *Attorney, Agent, or Firm* — Wenye Tan

(57) ABSTRACT

A control method for a charging port cover of a vehicle including a charging end assembly. The charging end assembly includes a charging port having a fast charging port and a slow charging port and a charging port cover having a fast charging port cover and a slow charging port cover. The method includes: when a charging port cover opening signal is received, controlling both the fast charging port cover and the slow charging port cover to be opened; when one of the fast charging port and the slow charging port is detected to be inserted with a plug-in end of a charging device, generating a charging port cover closing instruction; and controlling the charging port cover corresponding to the charging port into which the plug-in end is not inserted to be closed according to the charging port cover closing instruction.

16 Claims, 3 Drawing Sheets

100

(51) Int. Cl.
  B60L 53/16    (2019.01)
  H01R 13/447   (2006.01)

(56)     References Cited

FOREIGN PATENT DOCUMENTS

| | | | | | |
|---|---|---|---|---|---|
| CN | 107627882 | A | | 1/2018 | |
| CN | 208993788 | U | | 6/2019 | |
| CN | 110014958 | A | | 7/2019 | |
| CN | 107284264 | B | * | 9/2019 | ............. B62D 25/24 |
| CN | 111532156 | A | * | 8/2020 | ............. B62D 25/24 |
| CN | 111703325 | A | * | 9/2020 | ............. B60L 53/16 |
| CN | 113043880 | A | | 6/2021 | |
| JP | 2018079819 | A | | 5/2018 | |

* cited by examiner

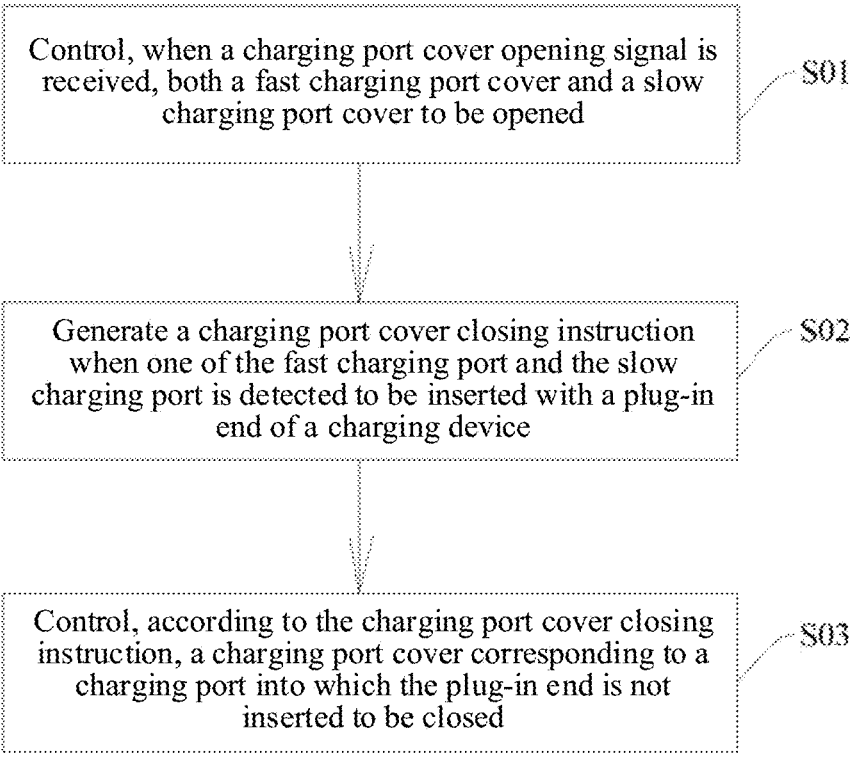

Control, when a charging port cover opening signal is received, both a fast charging port cover and a slow charging port cover to be opened —S01

Generate a charging port cover closing instruction when one of the fast charging port and the slow charging port is detected to be inserted with a plug-in end of a charging device —S02

Control, according to the charging port cover closing instruction, a charging port cover corresponding to a charging port into which the plug-in end is not inserted to be closed —S03

FIG. 1

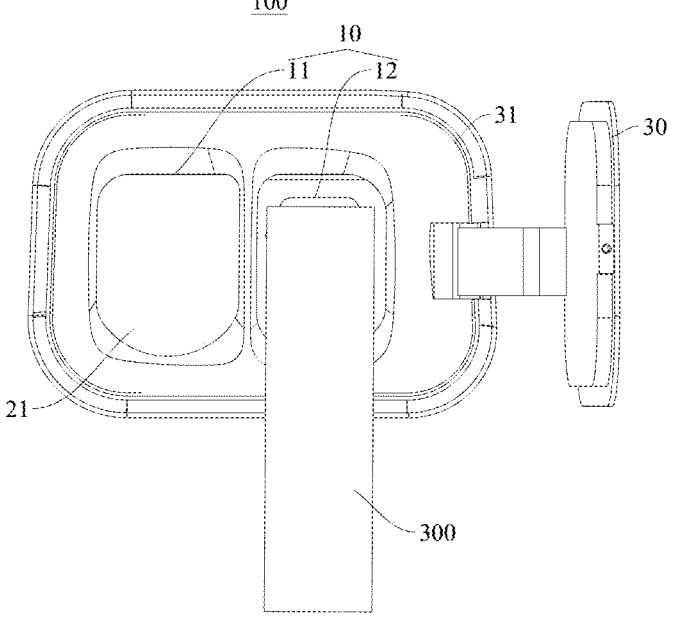

FIG. 2

VEHICLE CHARGING PORT COVER CONTROL METHOD AND VEHICLE CHARGING PORT COVER CONTROL DEVICE

CROSS-REFERENCE TO RELATED APPLICATIONS

The present application is a continuation application of PCT application No. PCT/CN2022/116187, filed on Aug. 31, 2022, which claims priority to Chinese Patent Application No. 202111014355.2, filed on Aug. 31, 2021 and entitled "Control method for charging port cover of vehicle and control device for charging port cover of vehicle", content of all of which is incorporated herein by reference in entirety.

FIELD

The present disclosure relates to a control method for a charging port cover of a vehicle, a computer-readable storage medium, a vehicle controller, and a control device for a charging port cover of a vehicle.

BACKGROUND

In related art, a charging end assembly of a vehicle includes a charging port cover and a charging port. The charging port includes a fast charging port and a slow charging port, and the charging port cover is used to open or close the fast charging port and the slow charging port at the same time. When the vehicle is charged by using the fast charging port, the slow charging port is in an open state, so the rain, dust and the like can easily enter the slow charging port, and charging failure tends to be caused when the vehicle is charged by using the slow charging port. When the vehicle is charged by using the slow charging port, the fast charging port is in an open state, so the rain, dust and the like can easily enter the fast charging port, and charging failure tends to be caused when the vehicle is charged by using the fast charging port.

SUMMARY

The present disclosure aims to solve at least one of the technical problems in the related art. To this end, an objective of the present disclosure is to provide a control method for a charging port cover of a vehicle.

The present disclosure further provides a computer-readable storage medium.

The present disclosure further provides a vehicle controller.

The present disclosure further provides a control device for a charging port cover of a vehicle.

In accordance with the control method for a charging port cover of a vehicle according to the present disclosure, the vehicle includes a charging end assembly. The charging end assembly includes a charging port and a charging port cover. The charging port includes a fast charging port and a slow charging port, and the charging port cover includes a fast charging port cover and a slow charging port cover. The fast charging port cover is configured to open or close the fast charging port, and the slow charging port cover is configured to open or close the slow charging port. The method includes: when a charging port cover opening signal is received, controlling both the fast charging port cover and the slow charging port cover to be opened; when one of the fast charging port and the slow charging port is detected to be inserted with a plug-in end of a charging device, generating a charging port cover closing instruction; and controlling the charging port cover corresponding to the charging port into which the plug-in end is not inserted to be closed according to the charging port cover closing instruction.

In accordance with the computer-readable storage medium according to the present disclosure, a control program for a charging port cover of a vehicle is stored thereon. When the control program for a charging port cover of a vehicle is executed by a processor, the control method for a charging port cover of a vehicle is implemented.

The vehicle controller according to the present disclosure includes a memory, at least one processor, and a control program for a charging port cover of a vehicle stored on the memory and able to run on the processor. When the control program for a charging port cover of a vehicle is executed by the processor, the control method for a charging port cover of a vehicle is implemented.

In accordance with the control device for a charging port cover of a vehicle according to the present disclosure, the vehicle includes a charging end assembly. The charging end assembly includes a charging port and a charging port cover. The charging port includes a fast charging port and a slow charging port, and the charging port cover includes a fast charging port cover and a slow charging port cover. The fast charging port cover is configured to open or close the fast charging port, and the slow charging port cover is configured to open or close the slow charging port. The device includes a receiving module, configured to receive a charging port cover opening signal; a control module, configured to control both the fast charging port cover and the slow charging port cover to be opened according to the charging port cover opening signal, generate a charging port cover closing instruction when one of the fast charging port and the slow charging port is detected to be inserted with a plug-in end of a charging device, and control the charging port cover corresponding to the charging port into which the plug-in end is not inserted to be closed according to the charging port cover closing instruction.

Additional aspects and advantages of the present disclosure will be partly given in the following description, some of which will become apparent from the following description, or may be learned from practices of the present disclosure.

BRIEF DESCRIPTION OF THE DRAWINGS

The above and/or other additional aspects and advantages of the present disclosure will become apparent and comprehensible from the description of embodiments in connection with accompanying drawings, in which:

FIG. 1 is a flowchart of a control method for a charging port cover according to an embodiment of the present disclosure;

FIG. 2 is a schematic view where an outer cover is opened and a fast charging port cover is closed according to an embodiment of the present disclosure;

DETAILED DESCRIPTION

Figure 3:
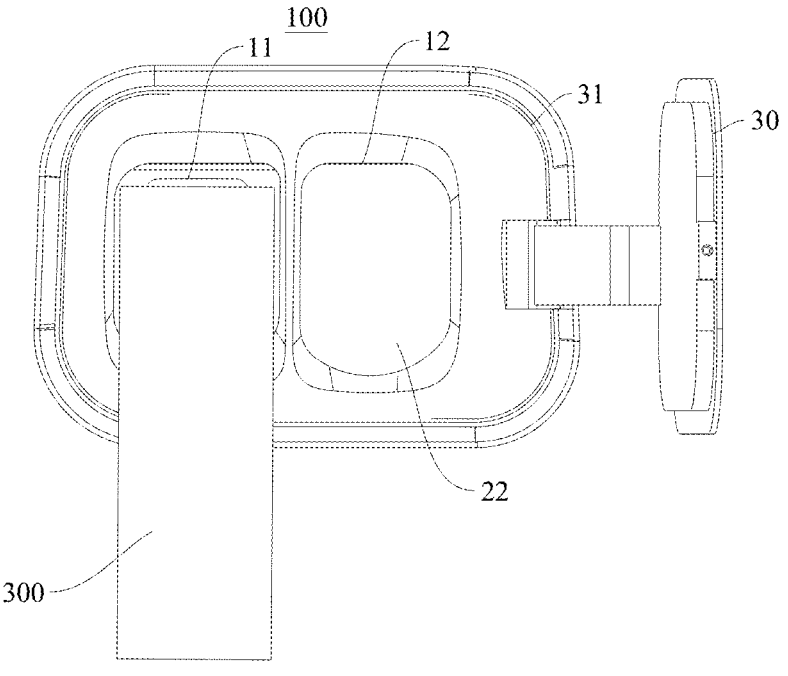
FIG. 3 is a schematic view where an outer cover is opened and a slow charging port cover is closed according to an embodiment of the present disclosure.
Figure 4:
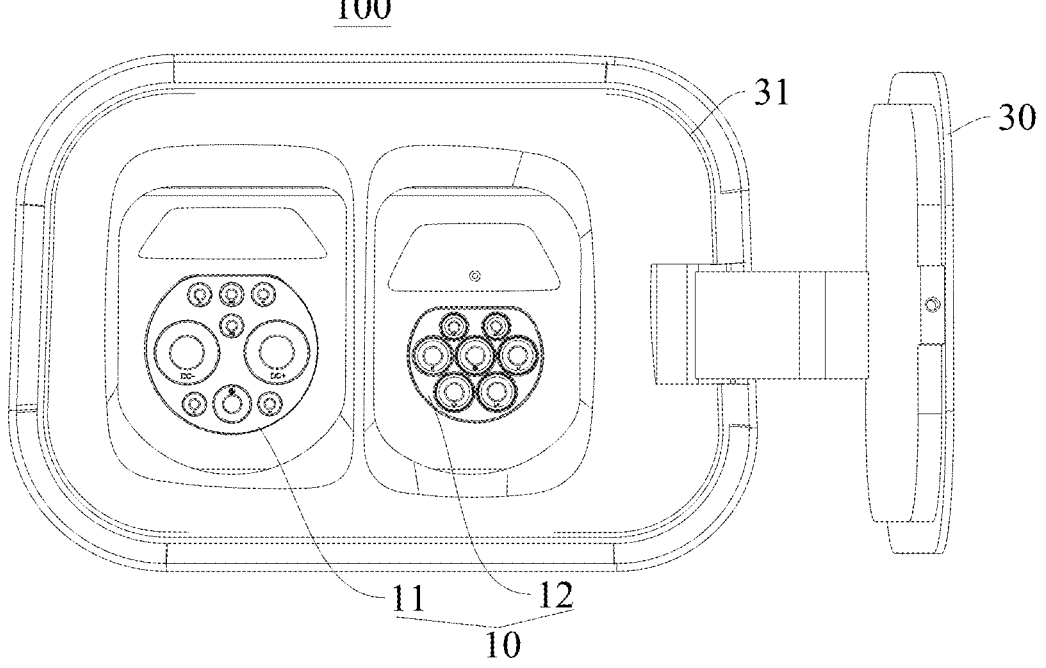
FIG. 4 is a schematic view where a fast charging port cover, a slow charging port cover and an outer cover are all opened according to an embodiment of the present disclosure.
Figure 5:
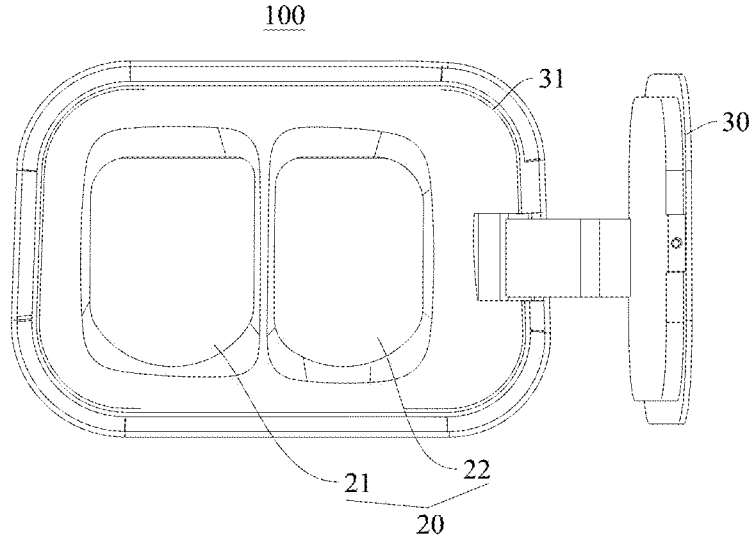
FIG. 5 is a schematic view where an outer cover is opened and a fast charging port cover and a slow charging port cover are both closed according to an embodiment of the present disclosure.
Figure 6:
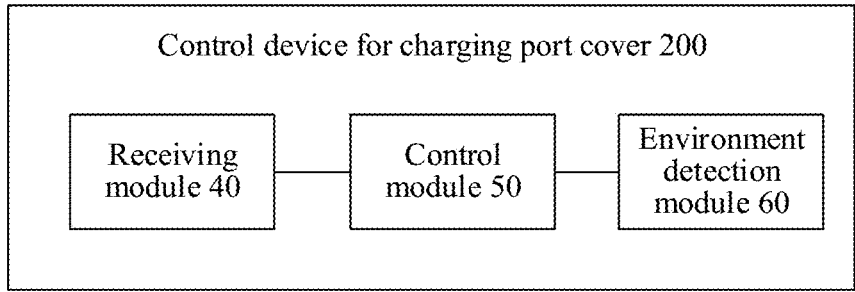
FIG. 6 is a block diagram of a control device for a charging port cover according to an embodiment of the present disclosure.

Embodiments of the present disclosure are described in detail below, and examples of the embodiments are shown in accompanying drawings, where the same or similar elements or the elements having the same or similar functions are denoted by the same or similar reference numerals throughout the description. The embodiments described below with reference to the accompanying drawings are illustrative and merely intended to explain the present disclosure, and cannot be construed as a limitation on the present disclosure.

A control device 200 for a charging port cover of a vehicle according to an embodiment of the present disclosure will be described below with reference to FIG. 2 to FIG. 6.

As shown in FIG. 2 to FIG. 6, in accordance with the control device 200 for a charging port cover of a vehicle according to the embodiment of the present disclosure, the vehicle includes a charging end assembly 100. The charging end assembly 100 includes a charging port 10 and a charging port cover 20. The charging port 10 includes a fast charging port 11 and a slow charging port 12, and the charging port cover 20 includes a fast charging port cover 21 and a slow charging port cover 22. The fast charging port cover 21 is configured to open or close the fast charging port 11, and the slow charging port cover 22 is configured to open or close the slow charging port 12.

As shown in FIG. 2 to FIG. 6, the control device 200 for a charging port cover of a vehicle according to the embodiment of the present disclosure includes: a receiving module 40 and a control module 50. The receiving module 40 is configured to receive a charging port cover opening signal. The control module 50 is configured to control both the fast charging port cover 21 and the slow charging port cover 22 to be opened according to the charging port cover opening signal, generate a charging port cover closing instruction when one of the fast charging port 11 and the slow charging port 12 is detected to be inserted with a plug-in end of a charging device 300, and control the charging port cover 20 corresponding to the charging port 10 into which the plug-in end is not inserted to be closed according to the charging port cover closing instruction.

In accordance with the control device for a charging port cover of a vehicle according to the present disclosure, the charging port cover corresponding to the charging port into which the plug-in end is not inserted can be controlled to be closed during the charging process of the vehicle, to prevent the rain, dust, and other pollutants from entering the charging port into which the plug-in end is not inserted, and avoid the charging failure of the charging end assembly.

The receiving module 40 is in communication connection with the control module 50. When a user sends a charging port cover opening signal to the vehicle, the receiving module 40 receives the charging port cover opening signal. For example, a vehicle controller sends a charging port cover opening signal to the receiving module 40. After receiving the charging port cover opening signal, the receiving module 40 sends the charging port cover opening signal to the control module 50. The control module 50 controls both the fast charging port cover 21 and the slow charging port cover 22 to be opened according to the charging port cover opening signal. The plug-in end of the charging device 300 is inserted into one of the fast charging port 11 and the slow charging port 12. The control module 50 generates a charging port cover closing instruction when one of the fast charging port 11 and the slow charging port 12 is detected to be inserted with the plug-in end of the charging device 300. Further, the generated charging port cover closing instruction can include an instruction of closing the fast charging port cover 21 or an instruction of closing the slow charging port cover 22. The control module 50 controls the charging port cover 20 corresponding to the charging port 10 into which the plug-in end is not inserted to be closed according to the charging port cover closing instruction. Such an arrangement enables the charging port cover 20 corresponding to the charging port 10 into which the plug-in end is not inserted to be closed during the charging process of the vehicle, to prevent the rain, dust, and other pollutants from entering the charging port 10 into which the plug-in end is not inserted, thereby avoiding the charging failure when the charging port 10 into which the plug-in end is not inserted is used for charging. Moreover, by the cooperation of the receiving module 40 and the control module 50, the fast charging port cover 21 and the slow charging port cover 22 can be automatically opened or closed, making the vehicle more intelligent.

Therefore, by the cooperation of the receiving module 40 and the control module 50, the charging port cover 20 corresponding to the charging port 10 into which the plug-in end is not inserted can be controlled to be closed during the charging process of the vehicle, to prevent the rain, dust, and other pollutants from entering the charging port 10 into which the plug-in end is not inserted, and avoid the charging failure of the charging end assembly 100.

In some embodiments of the present disclosure, the control device 200 for a charging port cover may further include: an environment detection module 60. The environment detection module 60 is in communication connection with the control module 50. The environment detection module 60 is configured to detect environmental information where the vehicle currently resides. Before the control module 50 controls both the fast charging port cover 21 and the slow charging port cover 22 to be opened, the environment detection module 60 detects the environmental information where the vehicle currently resides. The environment detection module 60 sends the environmental information where the vehicle currently resides to the control module 50. The control module 50 determines whether the charging port cover 20 meets an opening condition according to the environmental information, and prohibits the fast charging port cover 21 and the slow charging port cover 22 from being opened when the charging port cover 20 does not meet the opening condition. Such an arrangement can effectively prevent the rain dust, and other pollutants from entering the fast charging port 11 and the slow charging port 12.

Further, the environmental information can include rainfall information, and the environment detection module 60 can be a rainfall sensor. After the rainfall sensor transmits the detected rainfall information to the control module 50, when the control module 50 determines that the current rainfall is greater than or equal to a preset rainfall threshold according to the rainfall information according to the rainfall information, the control module 50 determines that the charging port cover 20 does meet the opening condition, and the charging port cover 20 is not opened. A current rainfall of greater than or equal to the preset rainfall threshold indicate a large rainfall. For example, when the current rainfall is greater than or equal to the preset rainfall threshold, the weather is identified as rainstorm. If the charging port cover 20 is opened at this time, water tends to enter the charging port 10 into which the plug-in end is inserted. Therefore, when the current rainfall is greater than or equal to the preset rainfall threshold, the control module 50 determines that the charging port cover 20 does meet the opening condition, and the charging port cover 20 is not opened. In this way, water can be prevented from entering the charging port 10 into which the plug-in end is inserted, thereby avoiding the charging failure caused by entering of the rain into the charging port 10 into which the plug-in end is inserted.

In some embodiments of the present disclosure, as shown in FIG. 2 to FIG. 5, the charging end assembly 100 may further include an outer cover 30. The charging end assembly 100 is provided with a charging hole 31, and both the charging port 10 and the charging port cover 20 are arranged in the charging hole 31. The outer cover 30 is configured to open or close the charging hole 31. When the receiving module 40 receives the charging port cover opening signal, the control module 50 controls the outer cover 30 to be opened automatically. Then, when the control module 50 determines that the charging port cover 20 meets the opening condition according to the environmental information detected by the environment detection module 60, the control module 50 controls the fast charging port cover 21 and the slow charging port cover 22 to be opened automatically. Through such an arrangement, the rain dust, and other pollutants can be ensured not to enter the charging port 10.

In some embodiments of the present disclosure, when the control module 50 controls the outer cover 30 to be opened automatically, if the control module 50 determines that the charging port cover 20 does not meet the opening condition according to the environmental information detected by the environment detection module 60, the control module 50 controls the vehicle to give prompt information that the fast charging port cover 21 and the slow charging port cover 22 are prohibited from being opened. Further, the control module 50 controls a display screen (including, but not limited to, a signal display screen) of the vehicle to give the prompt information that the outer cover 30 is opened and the fast charging port cover 21 and the slow charging port cover 22 are prohibited from being opened. At this time, the outer cover 30 is automatically opened. Only after the receiving module 40 receives the charging port cover opening signal again, the control module 50 can control both the fast charging port cover 21 and the slow charging port cover 22 to be opened, or a user opens the fast charging port cover 21 and the slow charging port cover 22 manually.

In some embodiments of the present disclosure, when the outer cover 30 is opened, the control module 50 determines that the charging port cover 20 meets the opening condition according to the environmental information detected by the environment detection module 60, and the control module 50 controls both the fast charging port cover 21 and the slow charging port cover 22 to be opened, the control module 50 controls the vehicle to give prompt information of permission for charging. Further, the control module 50 controls a display screen (including, but not limited to, a signal display screen) of the vehicle to give the prompt information that the outer cover 30, the fast charging port cover 21 and the slow charging port cover 22 are all opened, indicating that the charging is permitted.

In an embodiment of the present disclosure, the rainfall sensor can be provided on a windscreen wiper of the vehicle. At the time when the receiving module 40 receives the charging port cover opening signal, the control module 50 controls the outer cover 30 to be opened. The control module 50 reads a windscreen wiper signal sent from the rainfall sensor, and the control module 50 determines whether the environmental information where the vehicle currently resides indicates rainstorm according to the speed in the windscreen wiper signal. If rainstorm is indicated, both the fast charging port cover 21 and the slow charging port cover 22 are not opened, the control module 50 controls the vehicle to gives a prompt indicating that the outer cover 30 is opened, and the fast charging port cover 21 and the slow charging port cover 22 remains closed on the display screen (including, but not limited to, a signal display screen). At this time, the outer cover 30 is automatically opened. Only after the receiving module 40 receives the charging port cover opening signal again, the fast charging port cover 21 and the slow charging port cover 22 can be automatically opened, or a user opens the fast charging port cover 21 and the slow charging port cover 22 manually.

At the time when the receiving module 40 receives the charging port cover opening signal, the control module 50 controls the outer cover 30 to be opened. The control module 50 reads a windscreen wiper signal sent from the rainfall sensor, and the control module 50 determines whether the environmental information where the vehicle currently resides indicates rainstorm according to the speed in the windscreen wiper signal. If no rainstorm is indicated, the control module 50 controls the vehicle to gives a prompt indicating that the outer cover 30, the fast charging port cover 21, and the slow charging port cover 22 are opened on the display screen (including, but not limited to, a signal display screen). At this time, the outer cover 30, the fast charging port cover 21 and the slow charging port cover 22 are all automatically opened, and the vehicle is permitted to be charged. In the present disclosure, the windscreen wiper information is transmitted to the control module 50 by the rainfall sensor, and the control module 50 selects to open the outer cover 30 and/or the charging port cover 20 properly according to the information detected by the rainfall sensor. This conforms to the demand of a user in the practical application scenario, and brings better, safer and more convenient experience to the user.

As shown in FIG. 2 to FIG. 6, the vehicle includes a charging end assembly. The charging end assembly includes a charging port and a charging port cover. The charging port includes a fast charging port and a slow charging port, and the charging port cover includes a fast charging port cover and a slow charging port cover. The fast charging port cover is configured to open or close the fast charging port, and the slow charging port cover is configured to open or close the slow charging port. The control device for a charging port cover according to the foregoing embodiment can implement a control method for a charging port cover according to the present disclosure.

As shown in FIG. 1, the control method for a charging port cover according to an embodiment of the present disclosure includes the following steps:

S01: When a charging port cover opening signal is received, both the fast charging port cover and the slow charging port cover are controlled to be opened. Notably, the receiving module in the above embodiment is configured to receive the charging port cover opening signal, and the control module is configured to control both the fast charging port cover and the slow charging port cover to be opened according to the charging port cover opening signal.

S02: When one of the fast charging port and the slow charging port is detected to be inserted with a plug-in end of a charging device, a charging port cover closing instruction is generated. Notably, when the control module detects that one of the fast charging port and the slow charging port is inserted with the plug-in end of the charging device, the charging port cover closing instruction is generated.

S03: The charging port cover corresponding to the charging port into which the plug-in end is not inserted is controlled to be closed according to the charging port cover closing instruction. The control module controls the charging port cover corresponding to the charging port into which the plug-in end is not inserted to be closed according to the charging port cover closing instruction.

The receiving module is in communication connection with the control module. When a user sends a charging port cover opening signal to the vehicle, the receiving module receives the charging port cover opening signal. For example, a vehicle controller sends a charging port cover opening signal to the receiving module. After receiving the charging port cover opening signal, the receiving module sends the charging port cover opening signal to the control module. The control module controls both the fast charging port cover and the slow charging port cover to be opened according to the charging port cover opening signal. The plug-in end of the charging device is inserted into one of the fast charging port and the slow charging port. The control module generates a charging port cover closing instruction when one of the fast charging port and the slow charging port is detected to be inserted with the plug-in end of the charging device. Further, the generated charging port cover closing instruction can include an instruction of closing the fast charging port cover or an instruction of closing the slow charging port cover. The control module controls the charging port cover corresponding to the charging port into which the plug-in end is not inserted to be closed according to the charging port cover closing instruction. Such an arrangement enables the charging port cover corresponding to the charging port into which the plug-in end is not inserted to be closed during the charging process of the vehicle, to prevent the rain, dust, and other pollutants from entering the charging port into which the plug-in end is not inserted, thereby avoiding the charging failure when the charging port into which the plug-in end is not inserted is used for charging. Moreover, by the cooperation of the receiving module and the control module, the fast charging port cover and the slow charging port cover can be automatically opened or closed, making the vehicle more intelligent.

Therefore, by the control method for a charging port cover according to the present disclosure, the charging port cover corresponding to the charging port into which the plug-in end is not inserted can be controlled to be closed during the charging process of the vehicle, to prevent the rain, dust, and other pollutants from entering the charging port into which the plug-in end is not inserted, and avoid the charging failure of the charging end assembly.

In some embodiments of the present disclosure, before the fast charging port cover and the slow charging port cover are both controlled to be opened, the control method for a charging port cover further includes: determining environmental information where the vehicle currently resides, determining whether the charging port cover meets an opening condition according to the environmental information, and prohibiting the fast charging port cover and the slow charging port cover from being opened when the charging port cover does not meet the opening condition. Further, the environment detection module in the above embodiment can be in communication connection with the control module, the environment detection module is configured to detect the environmental information where the vehicle currently resides. Before the control module controls both the fast charging port cover and the slow charging port cover to be opened, the environment detection module detects the environmental information where the vehicle currently resides. The environment detection module sends the environmental information where the vehicle currently resides to the control module. The control module determines whether the charging port cover meets the opening condition according to the environmental information, and prohibits the fast charging port cover and the slow charging port cover from being opened when the charging port cover does not meet the opening condition. Such an arrangement can effectively prevent the rain dust, and other pollutants from entering the fast charging port and the slow charging port.

In some embodiments of the present disclosure, the environmental information can include rainfall information. The step of determining whether the charging port cover meets an opening condition according to the environmental information includes: when the current rainfall is determined to be greater than or equal to a preset rainfall threshold according to the rainfall information, determining that the charging port cover does not meet the opening condition. The environment detection module can be a rainfall sensor. After the rainfall sensor transmits the detected rainfall information to the control module, when the control module determines that the current rainfall is greater than or equal to the preset rainfall threshold according to the rainfall information according to the rainfall information, the control module determines that the charging port cover does not meet the opening condition, and the charging port cover is not opened. A current rainfall of greater than or equal to the preset rainfall threshold indicate a large rainfall. For example, when the current rainfall is greater than or equal to the preset rainfall threshold, the weather is identified as rainstorm. If the charging port cover is opened at this time, water tends to enter the charging port into which the plug-in end is inserted. Therefore, when the current rainfall is greater than or equal to the preset rainfall threshold, the control module determines that the charging port cover does not meet the opening condition, and the charging port cover is not opened. In this way, water can be prevented from entering the charging port into which the plug-in end is inserted, thereby avoiding the charging failure caused by entering of the rain into the charging port into which the plug-in end is inserted.

In some embodiments of the present disclosure, as shown in FIG. 2 to FIG. 6, the charging end assembly may further include an outer cover. When the charging port cover opening signal is received, the outer cover is controlled to be opened, and then when the charging port cover is determined to meet the opening condition according to the environmental information, both the fast charging port cover and the slow charging port cover are controlled to be opened. The charging end assembly is provided with a charging hole, and both the charging port and the charging port cover are arranged in the charging hole. The outer cover is configured to open or close the charging hole. When the receiving module receives the charging port cover opening signal, the control module controls the outer cover to be opened automatically. Then, when the control module determines that the charging port cover meets the opening condition according to the environmental information detected by the environment detection module, the control module controls the fast charging port cover and the slow charging port cover to be opened automatically. Through such an arrangement, the rain dust, and other pollutants can be ensured not to enter the charging port.

In some embodiments of the present disclosure, when the outer cover is opened, if the charging port cover is determined not to meet the opening condition according to the environmental information, the vehicle is controlled to give prompt information that the fast charging port cover and the slow charging port cover are prohibited from being opened. When the control module controls the outer cover to be opened automatically, if the control module determines that the charging port cover does not meet the opening condition according to the environmental information detected by the environment detection module, the control module controls the vehicle to give prompt information that the fast charging port cover and the slow charging port cover are prohibited from being opened. Further, the control module controls a display screen (including, but not limited to, a signal display screen) of the vehicle to give the prompt information that the outer cover is opened and the fast charging port cover and the slow charging port cover are prohibited from being opened. At this time, the outer cover is automatically opened. Only after the receiving module receives the charging port cover opening signal again, the control module can control both the fast charging port cover and the slow charging port cover to be opened, or a user opens the fast charging port cover and the slow charging port cover manually.

In some embodiments of the present disclosure, when the outer cover is opened, and both the fast charging port cover and the slow charging port cover are opened, the vehicle is further controlled to give prompt information of permission for charging. When the outer cover is opened, the control module determines that the charging port cover meets the opening condition according to the environmental information detected by the environment detection module, and the control module controls both the fast charging port cover and the slow charging port cover to be opened, the control module controls the vehicle to give the prompt information of permission for charging. Further, the control module controls a display screen (including, but not limited to, a signal display screen) of the vehicle to give the prompt information that the outer cover, the fast charging port cover and the slow charging port cover are all opened, indicating that the vehicle is permitted to be charged.

In an embodiment of the present disclosure, the rainfall sensor can be provided on a windscreen wiper of the vehicle. At the time when the receiving module receives the charging port cover opening signal, the control module controls the outer cover to be opened. The control module reads a windscreen wiper signal sent from the rainfall sensor, and the control module determines whether the environmental information where the vehicle currently resides indicates rainstorm according to the speed in the windscreen wiper signal. If rainstorm is indicated, both the fast charging port cover and the slow charging port cover are not opened. The control module controls the vehicle to gives a prompt indicating that the outer cover is opened, and the fast charging port cover and the slow charging port cover remains closed on the display screen (including, but not limited to, a signal display screen). At this time, the outer cover is automatically opened. Only after the receiving module receives the charging port cover opening signal again, the fast charging port cover and the slow charging port cover can be automatically opened, or a user opens the fast charging port cover and the slow charging port cover manually.

At the time when the receiving module receives the charging port cover opening signal, the control module controls the outer cover to be opened. The control module reads a windscreen wiper signal sent from the rainfall sensor, and the control module determines whether the environmental information where the vehicle currently resides indicates rainstorm according to the speed in the windscreen wiper signal. If no rainstorm is indicated, the control module controls the vehicle to gives a prompt indicating that the outer cover, the fast charging port cover, and the slow charging port cover are all opened on the display screen (including, but not limited to, a signal display screen). At this time, the outer cover, the fast charging port cover and the slow charging port cover are all automatically opened, and the vehicle is permitted to be charged. In the present disclosure, the windscreen wiper information is transmitted to the control module by the rainfall sensor, and the control module selects to open the outer cover and/or the charging port cover properly according to the information detected by the rainfall sensor. This conforms to the demand of a user in the practical application scenario, and brings better, safer and more convenient experience to the user.

In accordance with the computer-readable storage medium according to the embodiment of the present disclosure, a control program for a charging port cover of a vehicle is stored thereon. When the control program for a charging port cover of a vehicle is executed by a processor, the control method for a charging port cover of a vehicle according to the above embodiment is implemented.

In accordance with the computer-readable storage medium according to the embodiment of the present disclosure, when the control program for a charging port cover of a vehicle is executed by the processor, the charging port cover corresponding to the charging port into which the plug-in end is not inserted can be controlled to be closed during the charging process of the vehicle, to prevent the rain, dust, and other pollutants from entering the charging port into which the plug-in end is not inserted, and avoid the charging failure of the charging end assembly.

The vehicle controller according to the embodiment of the present disclosure includes a memory 1203, a processor 1201 and a control program for a charging port cover of a vehicle stored on the memory 1203 and able to run on the processor 1201. When the control program for a charging port cover of a vehicle is executed by the processor 1201, the control method for a charging port cover of a vehicle according to the above embodiment is implemented.

In accordance with the vehicle controller according to the embodiment of the present disclosure, by executing the control program for a charging port cover of a vehicle stored on the memory 1203 by the processor 1201, the charging port cover 20 corresponding to the charging port 10 into which the plug-in end is not inserted can be controlled to be closed during the charging process of the vehicle, to prevent the rain, dust, and other pollutants from entering the charging port 10 into which the plug-in end is not inserted, and avoid the charging failure of the charging end assembly 100.

Figure 7:
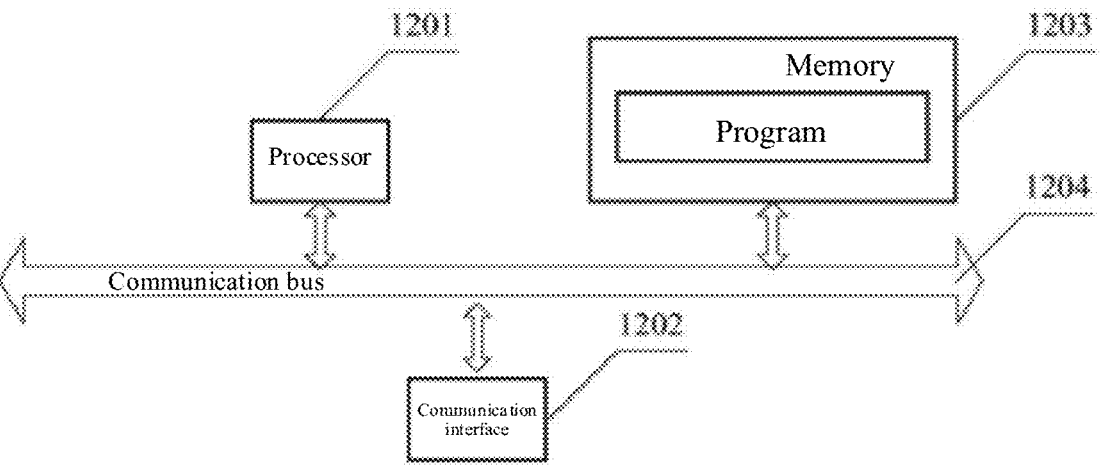
FIG. 7 is a schematic block diagram of a processor, a memory, a communication interface, and a communication bus according to an embodiment of the present disclosure.

As shown in FIG. 7, the vehicle controller includes at least one processor 1201, at least one communication interface 1202, at least one memory 1203 and at least one communication bus 1204. In an embodiment of the present disclosure, the number of the processor 1201, the communication interface 1202, the storage 1203, and the communication bus 1204 is at least one; and the processor 1201, the communication interface 1202, and the storage 1203 communicate with one another via the communication bus 1204.

The memory 1203 can be, but is not limited to, a random access memory (RAM), a read only memory (ROM), a programmable read-only memory (PROM), an erasable programmable read-only memory (EPROM), or an electric erasable programmable read-only memory (EEPROM), etc. The memory 1203 is configured to store a program. After receiving an execution instruction, the processor 1201 executes the program, to implement the steps of the control method for a charging port cover according to the above embodiment.

The processor 1201 may be an integrated circuit chip, and has a signal processing capability. The processor 1201 can be a general-purpose processor, including a central processing unit (CPU), and a network processor (NP) etc.; or a digital signal processors (DSP), an application specific integrated circuits (ASIC), a field programmable gate array (FPGA) or other programmable logic devices, a discrete gate or transistor logic device, and a discrete hardware assembly. It may implement or perform the methods, the steps, and logic block diagrams that are disclosed in the embodiments of the present disclosure. The general-purpose processor may be a microprocessor, or the processor 1201 may be any conventional processor 1201 or the like.

Notably, the logic and/or steps shown in the flowcharts or described otherwise herein, for example, a sequenced list that may be considered as executable instructions used for implementing logical functions, may be specifically implemented in any computer-readable medium, for use by an instruction execution system, apparatus, or device (for example, a computer-based system, a system including a processor, or other systems that can obtain an instruction from the instruction execution system, apparatus or device and execute the instruction), or for use with such instruction execution systems, apparatuses, or devices. In the specification, the "computer-readable medium" may be any apparatus that can include, store, communicate, propagate, or transmit programs for use by an instruction execution system, apparatus or device or for use with the instruction execution system apparatus or device. More specific examples (a non-exhaustive list) of the computer-readable medium include: an electrical connection (electronic device) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer-readable medium can even be paper or other suitable media on which the program can be printed, because the program can be obtained electronically by, for example, optically scanning paper or other media, then editing, deciphering, or processing in other suitable ways if necessary, and then storing it in a computer memory.

It should be understood that parts of the present disclosure can be implemented by hardware, software, firmware, or a combination thereof. In the foregoing implementations, steps or methods can be implemented by software or firmware that is stored in a memory and executed by a proper instruction execution system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combination of logic gate circuits, a programmable gate array (PGA), a field programmable gate array (FPGA), and the like.

In the description of the specification, the description with reference to the terms "an embodiment", "some embodiments", "exemplary embodiments", "example", "specific example", or "some examples" and so on means that specific features, structures, materials or characteristics described in connection with the embodiment or example are embraced in at least one embodiment or example of the present disclosure. In the specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A control method for a charging port cover of a vehicle, wherein the vehicle comprises a charging end assembly, the charging end assembly comprises a charging port and a charging port cover, the charging port comprises a fast charging port and a slow charging port, the charging port cover comprises a fast charging port cover and a slow charging port cover, the fast charging port cover is configured to open or close the fast charging port, the slow charging port cover is configured to open or close the slow charging port, the method comprising:

when a charging port cover opening signal is received, controlling both the fast charging port cover and the slow charging port cover to be opened;

when one of the fast charging port and the slow charging port is detected to be inserted with a plug-in end of a charging device, generating a charging port cover closing instruction; and controlling the charging port cover corresponding to the charging port into which the plug-in end is not inserted to be closed according to the charging port cover closing instruction, wherein when the outer cover is opened and the fast charging port cover and the slow charging port cover are both opened, the vehicle is controlled to give prompt information of permission for charging.

2. The control method according to claim 1, further comprising, before controlling both the fast charging port cover and the slow charging port cover to be opened, determining environmental information where the vehicle currently resides, and determining whether the charging port cover meets an opening condition according to the environmental information.

3. The control method according to claim 1, wherein when the charging port cover does not meet the opening condition, the fast charging port cover and the slow charging port cover are prohibited from being opened.

4. The control method according to claim 1, wherein the environmental information comprises rainfall information, and the determining whether the charging port cover meets an opening condition according to the environmental information comprises:

when the current rainfall is determined to be greater than or equal to a preset rainfall threshold according to the rainfall information, determining that the charging port cover does not meet the opening condition.

5. The control method according to claim 1, wherein the charging end assembly further comprises an outer cover, wherein when the charging port cover opening signal is received, the outer cover is controlled to be opened, and then when the charging port cover is determined to meet the opening condition according to the environmental information, both the fast charging port cover and the slow charging port cover are controlled to be opened.

6. The control method according to claim 1, wherein when the outer cover is opened, if the charging port cover is determined not to meet the opening condition according to the environmental information, the vehicle is controlled to give prompt information that the fast charging port cover and the slow charging port cover are prohibited from being opened.

7. A vehicle controller for a charging port cover of a vehicle, wherein the vehicle comprises a charging end assembly, the charging end assembly comprises a charging port and a charging port cover, the charging port comprises a fast charging port and a slow charging port, the charging port cover comprises a fast charging port cover and a slow charging port cover, the fast charging port cover is configured to open or close the fast charging port, the slow charging port cover is configured to open or close the slow charging port, the vehicle controller comprising:

a memory for storing computer-readable instructions; and at least one processor coupled to the memory and, when executing the computer-readable instruction, configured to perform:

when a charging port cover opening signal is received, controlling both the fast charging port cover and the slow charging port cover to be opened;

when one of the fast charging port and the slow charging port is detected to be inserted with a plug-in end of a charging device, generating a charging port cover closing instruction; and controlling the charging port cover corresponding to the charging port into which the plug-in end is not inserted to be closed according to the charging port cover closing instruction, wherein when the outer cover is opened and the fast charging port cover and the slow charging port cover are both opened, the vehicle is controlled to give prompt information of permission for charging.

8. The vehicle controller according to claim 7, before controlling both the fast charging port cover and the slow charging port cover to be opened, further comprising:

determining environmental information where the vehicle currently resides, and determining whether the charging port cover meets an opening condition according to the environmental information.

9. The vehicle controller according to claim 7, wherein, when the charging port cover does not meet the opening condition, the fast charging port cover and the slow charging port cover are prohibited from being opened.

10. The vehicle controller according to claim 7, wherein the environmental information comprises rainfall information, and the determining whether the charging port cover meets an opening condition according to the environmental information comprises:

when the current rainfall is determined to be greater than or equal to a preset rainfall threshold according to the rainfall information, determining that the charging port cover does not meet the opening condition.

11. The vehicle controller according to claim 7, wherein the charging end assembly further comprises an outer cover, wherein when the charging port cover opening signal is received, the outer cover is controlled to be opened, and then when the charging port cover is determined to meet the opening condition according to the environmental information, both the fast charging port cover and the slow charging port cover are controlled to be opened.

12. The vehicle controller according to claim 7, wherein when the outer cover is opened, if the charging port cover is determined not to meet the opening condition according to the environmental information, the vehicle is controlled to give prompt information that the fast charging port cover and the slow charging port cover are prohibited from being opened.

13. A non-transitory computer-readable storage medium containing computer-executable instructions for, when executed by one or more processors, performing a control method for a charging port cover of a vehicle, wherein the vehicle comprises a charging end assembly, the charging end assembly comprises a charging port and a charging port cover, the charging port comprises a fast charging port and a slow charging port, the charging port cover comprises a fast charging port cover and a slow charging port cover, the fast charging port cover is configured to open or close the fast charging port, the slow charging port cover is configured to open or close the slow charging port, the control method comprising:

when a charging port cover opening signal is received, controlling both the fast charging port cover and the slow charging port cover to be opened;

when one of the fast charging port and the slow charging port is detected to be inserted with a plug-in end of a charging device, generating a charging port cover closing instruction; and controlling the charging port cover corresponding to the charging port into which the plug-in end is not inserted to be closed according to the charging port cover closing instruction, wherein when the outer cover is opened and the fast charging port cover and the slow charging port cover are both opened, the vehicle is controlled to give prompt information of permission for charging.

14. The non-transitory computer-readable storage medium according to claim 13, further comprising, before controlling both the fast charging port cover and the slow charging port cover to be opened, determining environmental information where the vehicle currently resides, and determining whether the charging port cover meets an opening condition according to the environmental information.

15. The non-transitory computer-readable storage medium according to claim 13, wherein when the charging port cover does not meet the opening condition, the fast charging port cover and the slow charging port cover are prohibited from being opened.

16. The non-transitory computer-readable storage medium according to claim 13, wherein the environmental information comprises rainfall information, and the determining whether the charging port cover meets an opening condition according to the environmental information comprises:

when the current rainfall is determined to be greater than or equal to a preset rainfall threshold according to the rainfall information, determining that the charging port cover does not meet the opening condition.

* * * * *